(12) United States Patent
Perlman et al.

(10) Patent No.: US 11,018,859 B2
(45) Date of Patent: May 25, 2021

(54) DEDUPLICATION OF CLIENT ENCRYPTED DATA

(71) Applicant: EMC IP Holding Company, LLC, Hopkinton, MA (US)

(72) Inventors: Radia J. Perlman, Redmond, WA (US); Senthilkumar Ponnuswamy, San Jose, CA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 163 days.

(21) Appl. No.: 16/236,604

(22) Filed: Dec. 30, 2018

(65) Prior Publication Data
US 2020/0213109 A1    Jul. 2, 2020

(51) Int. Cl.
*H04L 9/08* (2006.01)
*G06F 16/215* (2019.01)
*H04L 9/06* (2006.01)

(52) U.S. Cl.
CPC .......... *H04L 9/0894* (2013.01); *G06F 16/215* (2019.01); *H04L 9/0643* (2013.01)

(58) Field of Classification Search
None
See application file for complete search history.

(56) References Cited

U.S. PATENT DOCUMENTS

2016/0291891 A1\* 10/2016 Cheriton ............. G06F 21/6218
2018/0232527 A1\* 8/2018 Haager ................. H04L 9/0894

\* cited by examiner

*Primary Examiner* — Brandon S Hoffman
(74) *Attorney, Agent, or Firm* — Barry N. Young

(57) ABSTRACT

Plaintext data is encrypted to produce ciphertext which is transmitted along with a hash of the plaintext data and corresponding metadata comprising an initialization vector and information about the encryption key version used to encrypt the plaintext data to a backend storage system. The encrypted ciphertext is deduplicated at the backend storage system (without first decrypting it) using the hash and stored based upon the metadata.

15 Claims, 4 Drawing Sheets

DEDUPLICATION OF CLIENT ENCRYPTED DATA

BACKGROUND

This invention relates generally to data deduplication in data storage systems, and more particularly to deduplication of encrypted data.

Data deduplication ("DDUP") involves eliminating duplicate copies of data to reduce storage resource requirements, network transmission time and bandwidth, and the amount of data exchanged between a client and a storage system, thereby reducing costs and improving performance. DDUP is particularly useful for systems that store data which is frequently updated or changed, as deduplication may be performed on blocks of data rather than on an entire file so that only the changed portion of data needs to be stored.

Storage systems are becoming larger and more distributed, and non-secure network transfers and cloud storage are increasingly being used by enterprises and other organizations for data transfer and primary data storage as well as for backup data storage. Some of this data may comprise sensitive, confidential information, and these entities are frequently required to transfer their data over untrusted, non-secure or public networks. Such non-secure storage systems and network transfers expose plaintext data to possible unwanted disclosure and exploitation. Entities may not wish to expose their data to an unsecure network or storage system. Therefore, they may need to protect the data at its source by encrypting it prior to transfer and storage.

With traditional systems, deduplication must be done on plaintext data. Encryption will normally prevent deduplication of the encrypted data. It is undesirable to distribute encryption keys to the storage system so that encrypted data transferred to the storage system can be decrypted for deduplication because this can compromise data security. As a result, an enterprise may be unable to achieve the benefits of deduplication if it encrypts data at its source before transfer to storage. Furthermore, data encryption frequently can be done more efficiently and cost effectively at its source by a client/server rather than by a storage system server, and in some instances it may be desirable to perform deduplication across multiple clients before encryption and storage.

It is desirable to provide systems and methods for secure data transfer and storage that address and overcome these and other known problems with data storage systems, and it is to these ends that the invention is directed.

BRIEF DESCRIPTION OF THE DRAWINGS

FIG. 2 comprising

DESCRIPTION OF PREFERRED EMBODIMENTS

The invention is particularly well adapted to be used with cloud-based deduplication, storage and backup systems, and will be described in that context. As will be appreciated, however, this is illustrative of only one utility of the invention, and that the invention has applicability to other types of systems and uses.

Figure 1:
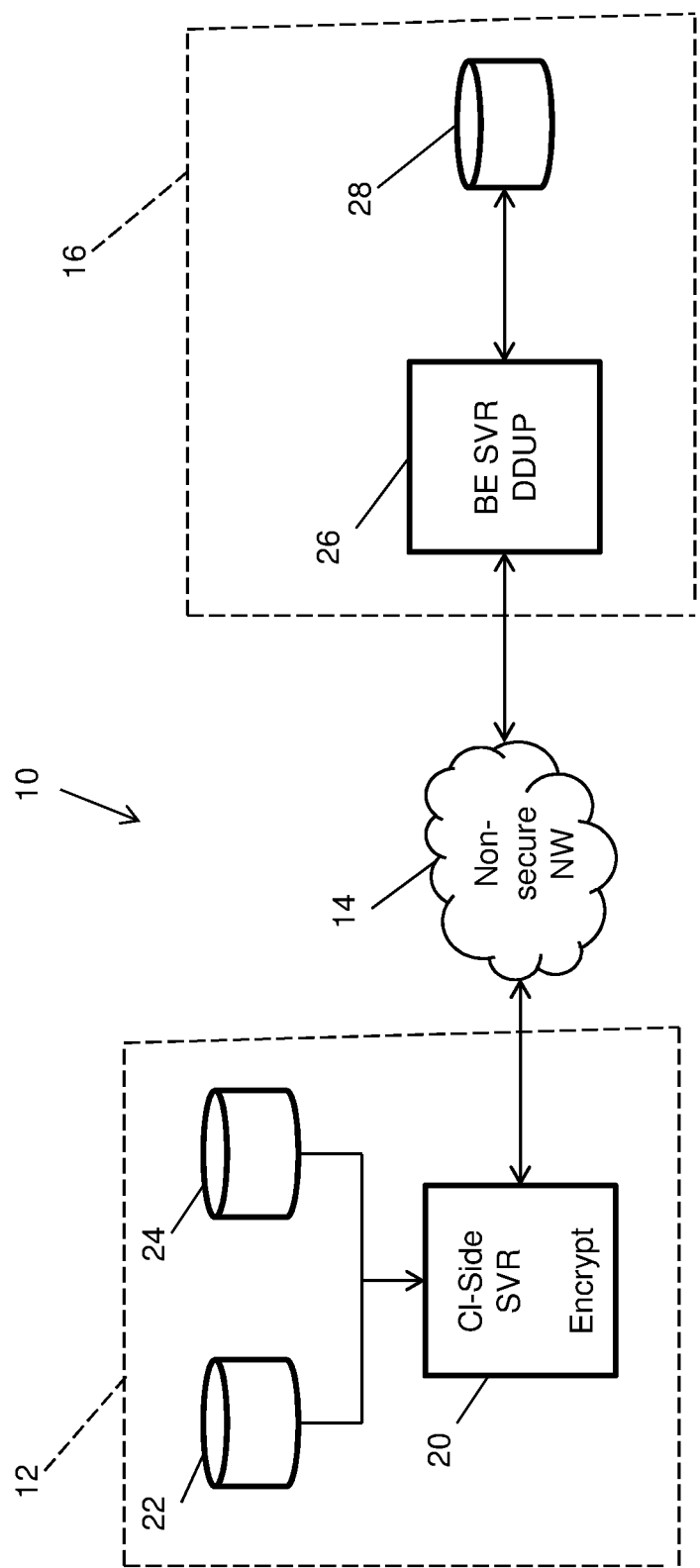
FIG. 1 is a functional block diagram illustrating an architecture of a system of the type in which the invention may be employed.

FIG. 1 is a functional block diagram that illustrates the architecture of a system 10 of the type with which the invention may be employed. System 10 may be a distributed processing and storage system of an enterprise that performs remote deduplication and storage of encrypted source data conveyed from a client-side subsystem 12 over a non-secure network 14 to a backend subsystem 16. The client-side subsystem 12 may comprise a client-side server 20 (also referred to herein as a "client") that processes source data in primary storage which may comprise hard disks 22, 24, for example, and stores the processed data in storage 28 of the backend system 16. Client 20 may encrypt the source data, as will be described, and transfer the encrypted data over the non-secure network 14 which may be a public or private data communications network that interconnects the client-side subsystem 12 with the backend subsystem 16 for transfer of data. The backend subsystem 16 may comprise a backend server 26 that deduplicates the received data from the client 20, as will be described, and stores the deduplicated data in backend storage 28.

Although FIG. 1 shows a single client-side server 20 and a single backend server 26, it will be appreciated that system 10 may comprise a plurality of client-side servers 20 and a plurality of backend servers 26. Each server of the two pluralities of servers may perform similar functions. The servers may comprise one or more processors and associated memory for storing executable instructions for controlling the operations of the one or more processors of each server to perform the functions described herein. As indicated in FIG. 1, and as will be described in more detail below, client 20 may encrypt primary source data and transfer the encrypted data over the network 14 to the backend server 26. The client 20 may also decrypt data returned via the network 14 from the backend server. As will also be described, the backend server 26 may deduplicate the encrypted data block in the write data received via the network from the client-side server without first decrypting it by deduplicating the hash of the plaintext data and its corresponding metadata in the write data block against previously stored hashes. If the received hash of the plaintext of the encrypted block in the write data is new, the server may store the ciphertext and metadata in the write block in backend storage 28. If, however, the hash and metadata already exist in storage, indicating that the data is duplicate data that has already been stored, the backend server does not store the data and metadata in the write block. Backend server 26 may comprise a DataDomain deduplication appliance of the Dell EMC.

As will also be described below, the backend server may also retrieve from backend storage and return read data requested by the client 20 along with some of its metadata to facilitate decryption. In an embodiment, backend system 16 may be located in a non-secure cloud environment which shares resources used by other enterprises.

In accordance with the invention, as described below, the backend system may deduplicate and store ciphertext that was encrypted by a client-side server without having access to either the plaintext or the encryption keys and without first decrypting the ciphertext. Furthermore, the backend system may deduplicate encrypted data blocks when the plaintext of two blocks is the same, even though the backend server and storage system see only encrypted data blocks. Moreover, an encrypted block of plaintext may be deduplicated even if the client/server has done a key rollover between the time the client/server first encrypted the block and the time when the backend server stored the block to backend storage. In accordance with the invention, the client/server may choose an arbitrary initialization vector (IV) for combining with the plaintext before creating the encrypted block of ciphertext—however the storage system may store only one version of an encrypted block that has been deduplicated. The initialization vector may be, for example, either a random or pseudorandom non-repeating primitive, such as a number used once (nonce) that is combined with the plaintext prior to encryption to randomize the plaintext.

In the description that follows herein, the following abbreviations have the following meanings:

"PT" refers to plain text data;
"DEK" refers to a data encryption key;
"IV" refers to an initialization vector used for encrypting the PT; it is typically a random or pseudorandom number that is used once (a "nonce") that is combined with the plaintext to randomize the PT before encryption;
"$S_A$" refers to a client's DEK;
"$MS_A$" refers to metadata about a client's DEK, e.g., a key version identifier (ID); and
"CT" refers to ciphertext obtained by encrypting PT.

As described above, with traditional systems, deduplication has to be done using plaintext blocks, so a straightforward approach to addressing some of the above issues would be to perform deduplication prior to encryption. However, for data security reasons, it is desirable to maintain the plaintext confidential during transfer and at the storage system. Additionally, it may be more cost-effective to perform deduplication of data received across multiple clients which is best done at a deduplication server. One approach for addressing these issues would be for the client to encrypt all blocks with the same DEK and to use a constant IV for all blocks. This would enable deduplication since the ciphertext would always be the same for the same block of plaintext, but it would not allow for deduplication across different key versions if the client changed its DEK.

Figure 2A:
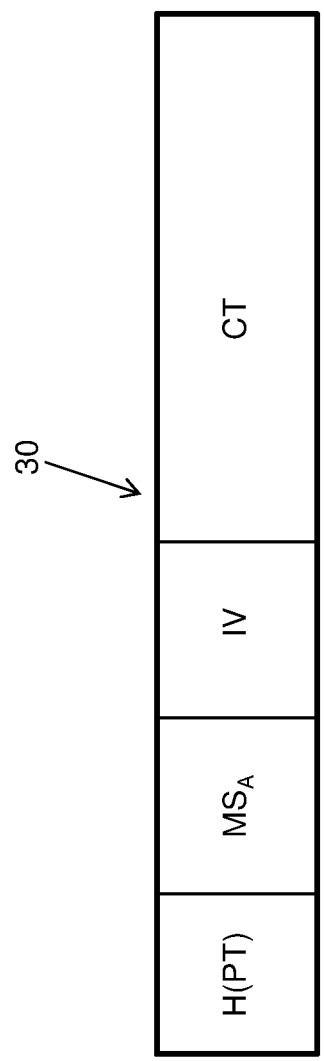
FIGS. 2A and 2B are diagrammatic representations of data block formats for respectively writing and reading encrypted data to and from a storage system in accordance with an embodiment of the invention.

Rather, in accordance with the invention, the client preferably encrypts a block of plaintext data combined with an IV using a DEK, and transmits the resulting encrypted data, i.e., ciphertext (CT), with additional unique characterizing metadata to the backend system for storage. The client may employ any of various different types of encryption schemes to create the ciphertext. In addition to creating the ciphertext (CT), the client may additionally create the additional unique data and metadata and transfer it with the ciphertext to the storage system. In an embodiment of the invention, the unique data may comprise a hash of the block of plaintext ("H{PT}"), and the unique metadata may comprise metadata ($S_A$) about the client's DEK (such as a key version identifier—without the actual key) and the initialization vector (IV) used in the encryption of the plaintext data. The ciphertext and the unique hash and metadata may be included in a block of write data that is transferred over the network to the backend system to be deduplicated and written to backend storage. FIG. 2A illustrates one exemplary embodiment of a format for a block 30 of write data comprising metadata and ciphertext (CT) for a block of encrypted plaintext. Upon receiving this write data, the backend server may perform deduplication by comparing the hash and possibly the other unique metadata information in the block of write data to previously stored hashes and metadata in the backend server, as described below and in more detail in connection with FIG. 3.

If the client attempts to write to storage a block of write data for a block of plaintext that has a hash which matches a hash that has already been stored in the backend storage, the backend server may compare the metadata in the received block of write data for the encrypted block to identify differences between the current metadata and the previously stored metadata corresponding to the previously stored matching hash. If the metadata is the same, the backend server may report that the data is duplicated and not store it. However, if the metadata received from the client is different, e.g., a higher key version number for the current write data than the previously stored key version number for the data previously stored in the backend storage, the backend server may accept the new write block and overwrite the previously stored block. The reason is that it may be assumed that the client wishes to replace the stored data previously encrypted with an older key version with the current received data encrypted with a newer key version.

Figure 2B:
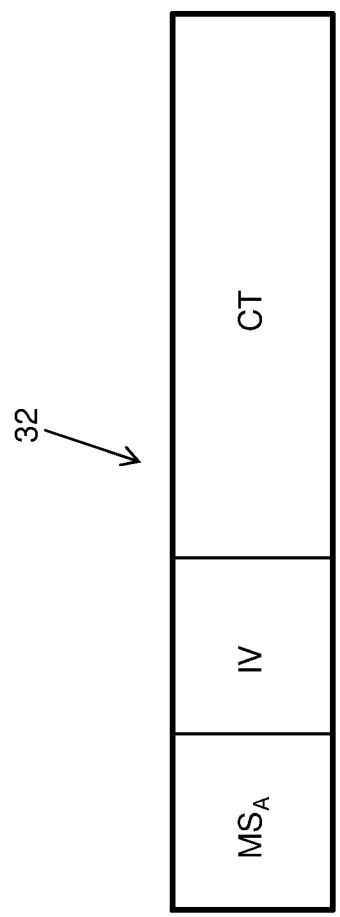
Figure 4:
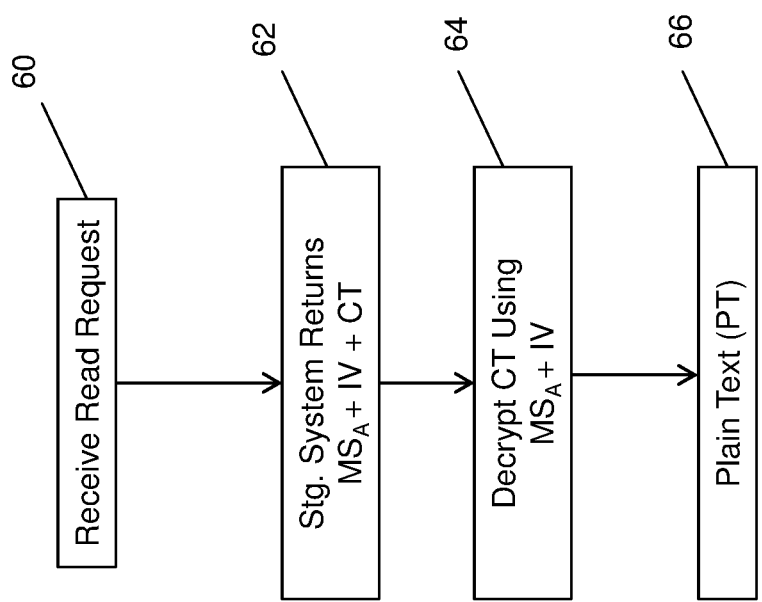
FIG. 4 is a diagrammatic view of a process for reading encrypted data from a storage system in accordance with the invention.

On the other hand, when the client attempts to read an encrypted block of data from the backend storage system, in accordance with an embodiment of the invention the storage system may return to the client a read block comprising the ciphertext corresponding to the requested block and its associated stored metadata comprising the key version number and the initialization vector so that the client will be able to decrypt the read block. FIG. 2B illustrates an example of a format for a read block 32 that may be returned by the backend server in response to a read request. FIG. 4 illustrates a process in accordance with an embodiment of the invention for responding to a read request from a client by returning the requested block of ciphertext and associated metadata for decrypting the returned encrypted block.

Figure 3:
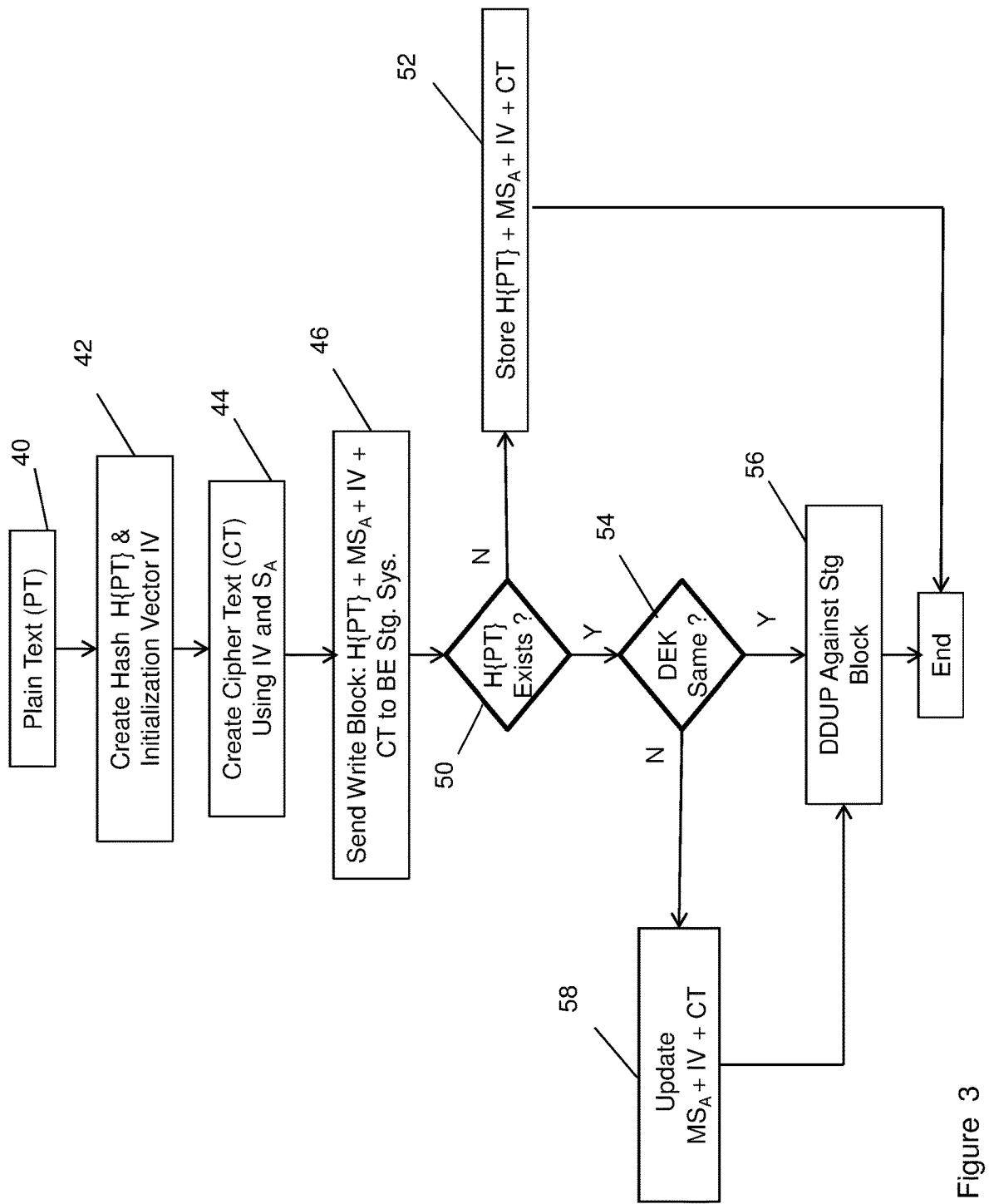
FIG. 3 is a diagrammatic view of a process for deduplicating and writing encrypted data to a storage system in accordance with an embodiment of the invention.

FIG. 3 illustrates a process in accordance with one embodiment of the invention for creating, deduplicating and storing a block of write data in system storage. Referring to the figure, at 40 the client has plaintext data that it wishes to encrypt and store in remote deduplicated system storage, such as for instance the cloud. At 42, the client may first create a hash (H{PT}) of a block of plaintext data by applying to the plaintext data a hash function H that deterministically produces a unique hash value H{PT}. Any of a number of known hash functions that produce a unique non-repeating hash for the plaintext may be used. The client may additionally create an initialization vector IV, as previously described, combine the block of plaintext with the initialization vector to randomize the plaintext, and at 44 encrypt the block of plaintext data and the initialization vector IV using a data encryption key DEK $S_A$ to create ciphertext CT. Preferably, a new different IV is created and used for each different block of plaintext data. At 46, the client may create a write block H{PT}+$MS_A$+IV+CT comprising the hash H{PT} of a block of plaintext PT, metadata $MS_A$ about the client's DEK $S_A$, the initialization vector IV for the block of plaintext, and the corresponding ciphertext CT. FIG. 2A illustrates an example of a format for the write block, which may be transmitted to the backend storage system 16 via the network 14 for deduplication and storage in the backend storage 28.

Upon receiving the write block, at 50 the backend server 36 of the backend storage system may perform deduplication of the received ciphertext CT in the write block by comparing the corresponding hash H{PT} in the write block with previously stored hashes in the system storage to determine whether the received hash H{PT} already exists. If the comparison finds no match, indicating that the received hash H{PT} is new and that the corresponding encrypted plaintext block, i.e., ciphertext CT, does not correspond to duplicated plaintext data, at 52 the backend server may store the hash H{PT} and the associated unique metadata and ciphertext H{PT}+MS$_A$+IV+CT] in the backend system storage.

If, instead, at 50 the hash H{PT} in the write block already exists in storage, at 50 the backend server determines from the received metadata in the write block whether the client's encryption key S$_A$ for the CT is the same or whether the key has changed. If the key is still the same, at 56 the backend server deduplicates the received block against the stored block by determining that the received block comprises duplicate information, and may take no action to store the data in the received write block. On the other hand, if at 54, the key is not the same but has changed, the previously stored block may be updated at 58 and replaced with a new block MS$_A$+IV+CT, and previous deduplications may be maintained. As indicated above, the new block may replace the previous block because it may be assumed that the client prefers to replace data previously encrypted with an old key version within a new updated key version.

In another embodiment, to improve performance, the client may send a block H{PT}+MS$_A$ of hash and metadata to the storage system corresponding to new block of plaintext. If the storage system determines there is a previously stored matching hash and metadata, it may decide that there is no need to store a corresponding write block and inform the client of the match. If the client is aware that a matching H{PT}+MS$_A$ is already known to the storage system, the client need not either encrypt the plaintext or send the ciphertext for deduplication and storage because it already exists, thus avoiding the necessity for the expenditure of unneeded resources and improving performance.

FIG. 4 illustrates a process for reading deduplicated and encrypted data from the storage system. At 60, the backend server 14 may receive a read request from the client for a block of stored encrypted data. At 62, the backend server may retrieve the requested data and return to the client a read block comprising the requested ciphertext CT plus the associated metadata, i.e., MS$_A$+IV+CT originally stored with the write data. At 64, the client may use the metadata MS$_A$+IV to retrieve the relevant DEK S$_A$ and IV to decrypt the ciphertext CT and produce plaintext PT at 66.

As may be appreciated, the invention enables an enterprise to improve the efficiency and reduce storage costs while maintain the confidentiality of sensitive data when transferring the data over a non-secure network and deduplicating and storing the encrypted data in backend storage by transferring with the ciphertext and using for deduplication a hash of the plaintext data and its associated unique metadata.

It will also be appreciated that while the foregoing has been with reference to particular embodiments of the invention, changes to these embodiments may be made without departing from the principles of the invention as defined by the appended claims.

The invention claimed is:

1. A method of deduplicating and storing encrypted data comprising:
 receiving a write block that includes a hash of plaintext, ciphertext produced by encrypting the plaintext using an encryption key, and metadata identifying the encryption key used to encrypt the plaintext; and
 deduplicating and storing the ciphertext by comparing the hash and the metadata against previously stored hashes and previously stored metadata without access to the decryption key or the plaintext and without decrypting the ciphertext.

2. The method of claim 1, wherein said encrypting further comprises combining said plaintext with an initialization vector prior to said encrypting, and wherein said metadata identifies a particular version of said encryption key used for said encrypting.

3. The method of claim 2, wherein said initialization vector is chosen by a random or a pseudorandom primitive.

4. The method of claim 1, wherein said deduplicating comprises comparing said hash and metadata against said previously stored hashes and previously stored metadata and, upon detecting a matching hash corresponding to previously stored ciphertext that was produced with a different version of an encryption key than used for said encrypting plaintext corresponding to said previously stored ciphertext, replacing said previously stored ciphertext and said previously stored metadata corresponding to said matching hash with said hash, said ciphertext and said metadata in said write block.

5. The method of claim 4 further comprising upon no matching hash being found for said hash, storing contents of said write block as new data in system storage.

6. The method of claim 1, wherein said metadata about said data encryption key comprises an identifier of a key version that was used to encrypt the plaintext.

7. The method of claim 1 further comprising receiving a new hash of new plaintext to be deduplicated and corresponding new metadata, and upon a match being found to a previously stored hash and metadata, informing a client to not encrypt said new plaintext and to not send a corresponding write block for deduplication and storage.

8. A method of deduplicating and storing encrypted data comprising:
 creating a hash of plaintext data;
 encrypting the plaintext data using an encryption key to produce ciphertext;
 forming a write block comprising the ciphertext, said hash, and metadata identifying said encryption key; and
 sending said write block to a storage system for deduplicating and storing the ciphertext by comparing the hash and the metadata against previously stored hashes and metadata without access to the decryption key or the plaintext and without decrypting said ciphertext.

9. The method of claim 8, wherein said encrypting further comprises combining said plaintext with an initialization vector chosen by a random or a pseudorandom primitive prior to said encrypting, and said metadata identifies a particular version of said encryption key.

10. The method of claim 9 further comprising receiving from said storage system in response to a read request a block of read data comprising ciphertext and metadata corresponding to said encryption key, and using said metadata to decrypt said ciphertext.

11. Computer readable non-transitory storage medium embodying instructions for controlling the operation of a processor to perform a method of deduplicating and storing encrypted data comprising:
 receiving a write block that includes a hash of plaintext, ciphertext produced by encrypting the plaintext using an encryption key, and metadata identifying the encryption key used to encrypt the plaintext; and
 deduplicating and storing the ciphertext by comparing the hash and the metadata against previously stored hashes and previously stored metadata without access to the decryption key or the plaintext and without decrypting said ciphertext.

12. The computer readable non-transitory storage medium of claim 11, wherein said encrypting further comprising using an initialization vector created by a random or a pseudorandom primitive.

13. The computer readable non-transitory storage medium of claim 11, wherein said deduplicating comprises comparing said hash and metadata against said previously stored hashes and previously stored metadata and, upon detecting a matching hash having associated ciphertext that was produced with a different version of an encryption key than used for said encrypting said plaintext, replacing said ciphertext and said previously stored metadata corresponding to said matching hash with said hash, said ciphertext and said metadata in said write block.

14. The computer readable non-transitory storage medium of claim 13 further comprising upon no matching hash being found for said hash, storing contents of said write block as new data in system storage.

15. The computer readable non-transitory storage medium of claim 13 further comprising receiving a new hash of new plaintext to be deduplicated and corresponding new metadata, and upon a match being found to a previously stored hash and metadata, informing a client to not encrypt said new plaintext and to not send a corresponding write block for deduplication and storage.

* * * * *